United States Patent [19]

Kilgour

[11] Patent Number: 4,746,683
[45] Date of Patent: May 24, 1988

[54] POLYETHER SILICONE COPOLYMERS WITH SECONDARY OR TERTIARY HYDROXY TERMINATION FOR STABILIZING HIGH RESILIENCY URETHANE FOAM

[75] Inventor: John A. Kilgour, Putnam Valley, N.Y.

[73] Assignee: Union Carbide Corporation, Danbury, Conn.

[21] Appl. No.: 102,368

[22] Filed: Sep. 29, 1987

[51] Int. Cl.$^4$ .............................................. C08J 9/00
[52] U.S. Cl. .................................. 521/112; 252/182.14
[58] Field of Search ........................ 521/112; 252/182

[56] References Cited

U.S. PATENT DOCUMENTS

| | | | |
|---|---|---|---|
| 2,901,445 | 8/1959 | Harris | 260/215 |
| 3,741,917 | 6/1973 | Morehouse | 260/215 |
| 3,839,384 | 10/1974 | Morehouse | 260/215 |
| 3,884,847 | 5/1975 | Pruvost et al. | 260/215 |
| 3,905,924 | 9/1975 | Prokai | 260/215 |
| 4,031,044 | 6/1977 | Joslyn | 260/215 |
| 4,039,490 | 8/1977 | Kanner | 260/215 |
| 4,067,828 | 1/1978 | Kanner et al. | 260/215 |
| 4,110,272 | 8/1978 | Kanner et al. | 521/112 |
| 4,136,239 | 1/1979 | Rossmay | 521/112 |
| 4,269,992 | 5/1981 | Litteral et al. | 521/112 |
| 4,306,035 | 12/1981 | Baskent et al. | 521/112 |
| 4,309,508 | 1/1982 | Baskent et al. | 521/112 |
| 4,347,330 | 8/1982 | Demou et al. | 521/112 |
| 4,477,601 | 10/1984 | Battice | 521/ |
| 4,478,957 | 10/1984 | Klietsch et al. | 521/ |
| 4,529,743 | 7/1985 | Kollmeier et al. | 521/112 |
| 4,588,755 | 5/1986 | Kollmeier et al. | 521/112 |
| 4,690,955 | 9/1987 | Kilgour et al. | 521/ |

*Primary Examiner*—Morton Foelak
*Attorney, Agent, or Firm*—Paul W. Leuzzi

[57] ABSTRACT

This invention describes novel molded flexible polyurethane foam surfactants which can be used in foam having high concentrations of reinforcing graft copolymer solids. The invention also describes an improved process for making these foams using the novel surfactants.

9 Claims, No Drawings

POLYETHER SILICONE COPOLYMERS WITH SECONDARY OR TERTIARY HYDROXY TERMINATION FOR STABILIZING HIGH RESILIENCY URETHANE FOAM

BACKGROUND OF THE INVENTION

1. Field of the Invention

This invention relates to high resiliency polyurethane foam surfactants. More specifically, this invention relates to novel surfactants made from polydialkylsiloxanepolyoxyalkylene copolymers which have secondary or tertiary hydroxy terminated polyoxyalkylene pendants on the copolymer. These surfactants have particular advantage in obtaining good breathability in high resiliency polyurethane foam with higher than normal amounts of solid polymer.

2. Prior Art

High resiliency polyurethane foams are produced by the reaction of high molecular weight polyols, which polyols have greater than 40% of primary hydroxyl capping, with organic isocyanates and water. High resiliency polyurethane foams are distinguishable, in part, from conventional hot cure polyurethane foams by the use of such a high percentage of primary hydroxyl groups as well as by the fact that high resiliency polyurethane foams require little or no oven curing and thus are often referred to as cold cure foams. Such foams are extremely desirable for cushioning applications because of their excellent physical properties, e.g., very high foam resiliency, open celled structure, low flex fatigue, i.e., long life, and high SAC factors, i.e., load bearing properties.

Because of the high reactivity of high resiliency foam ingredients and their rapid buildup of gel strength, sometimes the foam can be obtained without a cell stabilizer. However, such foams typically have very irregular, coarse cell structure as particularly evidenced by surface voids. A variety of attempts have been made to solve this problem through the use of stabilizers consisting of substituted polydimethyl- or polyphenylmethylsiloxanes.

One group of stabilizers, described in U.S. Pat. Nos. 3,741,917 to Morehouse et al and 4,031,044 to Joslyn et al., is based on polydimethylsiloxanepolyoxyalkylene copolymers. The polyoxyalkylene pendant groups on the stabilizers in these patents, however, are always hydrocarbon capped.

Other polysiloxanes bearing pendant groups have also been claimed as stabilizers for high resiliency urethane foam. In general they are copolymers consisting of a polydimethylsiloxane to which are attached organic pendant groups that include: methyl groups (U.S. Pat. No. 2,901,445); cyanoalkyl groups (U.S. Pat. No. 3,905,924); phenylethyl groups (U.S. Pat. No. 3,839,384); alkyl groups (U.S. Pat. No. 4,306,035); trimethylsiloxy groups (U.S. Pat. No. 3,884,847); sulfolanyloxyalkyl groups (U.S. Pat. No. 4,110,272); morpholinoalkoxyalkyl groups (U.S. Pat. No. 4,067,828), and the tertiary hydroxyalkyl group (U.S. Pat. No. 4,039,490). None of these patents suggest hydroxy terminated polyoxyalkylene pendant groups attached to the siloxane chain.

Recent U.S. Pat. No. 4,478,957 to Klietsch et al does describe polysiloxanepolyoxyalkylene copolymers wherein the polyoxyalkylene portions of the copolymer are either totally hydroxy terminated or totally alkyl, carboxy, or alkylaryl capped.

All of the above mentioned stabilizers have been designed for high resiliency polyurethane foam containing low levels of reinforcing grafted copolymer rather than those containing high concentrations of these materials. This distinction is important for reasons discussed below.

Grafted copolymer polyols are typically prepared by polymerizing one or more ethylenically unsaturated monomers, for example styrene and acrylonitrile, in a polyether polyol, or by reacting diisocyanates with polyamines or hydrazines in a polyether polyol. Typically, the grafted copolymer polyols for current polyurethane formulations contain about 20 percent solids in the polyol. This is normally formulated as about 50 percent of the final grafted copolymer content, thus bringing the actual solids content to about 10 percent.

Recently, however, it has become desirable to manufacture high resiliency foam with increased firmness. Increased firmness is desirable so that thinner or lower density foam sections can be manufactured with load bearing properties equal to sections currently being made, or for the manufacture of sections with greater firmness where higher load bearing foam is desired. Such improved foams are especially desirable in the automotive seat market where reduced size and weight are important considerations in the design of smaller automobiles. One important method of achieving greater foam firmness is to increase the concentration of solids used in the urethane formulation.

More recently, blends of conventional flexible polyurethane foam surfactants and high resiliency polyurethane foam surfactants (U.S. Pat. Nos. 4,309,508 and 4,477,601) have been taught as a method of increasing the concentration of these solids in the total polyol mixture. The small amounts of a conventional surfactant required presents considerable difficulties as minor errors in preparing these stabilizers can have significant, adverse effects on the performance characteristics of foam stability or foam breathability. Also, as in those systems for stabilizing low levels of grafted copolymer solids, hydroxy groups are not present as the capping group in the pendant chain of these copolymers.

Of further concern in selecting a stabilizer is the breathability or open celled character of foam. Greater breathability, i.e., more open celled character, of the foam is desirable because it provides a greater processing latitude. A narrow processing latitude forces the foamer to adhere to very close tolerances in metering out the foaming ingredients which can not always be accomplished. Further, greater breathability provides foam that is easier to crush, thus avoiding splits that might occur during crushing. This characteristic is particularly desirable in foamed parts that incorporate wire inserts which are difficult to crush.

Recently, U.S. patent application Ser. No. 880,295 filed June 30, 1986 disclosed the use of mixed functional pendant silicone surfactants for stabilization of high solids, high resiliency polyurethane foam. The mixed monomer polyethers of that patent application are prepared in the manner customary to the art by coreacting the desired alkylene oxides with the starting alkoxide. This allows for the kinetic determination of terminal group rather than the addition controlled method claimed in this patent. No mention is made of controlling the foam openness by changing the nature of the alcohol terminal group.

This invention provides stabilizers that continue to provide foam stability for the desired higher levels of grafted copolymer solids in high resiliency molded polyurethane foam while also providing high breathability foams, i.e. foams with a much more open celled character. A method is provided for preparing these stabilizers. A method is further provided for meeting the stability and breathability requirements of particular firm foam formulations over a wide range of reinforcing grafted copolymer concentrations.

OBJECTIVES

It is thus an object of this invention to provide increased foam breathability by utilizing polydialkylsiloxanepolyoxyalkylene copolymers having polyoxyalkylene pendants terminated with a secondary or tertiary hydroxy group.

Another object of this invention is to provide a process for making an improved open celled, i.e., high breathability, polyurethane foam from the copolymer described.

It is a still further object of this invention to provide surfactants which can be used in manufacturing foam with higher than normal amounts of solid polymer.

It is yet another object of this invention to provide foams having fewer surface voids.

Other objects and advantages of the invention will become apparent as the description thereof proceeds.

BRIEF SUMMARY OF THE INVENTION

This invention provides polydialkylsiloxane copolymers bearing secondary or tertiary hydroxy terminated polyoxyalkylene pendants that can be used to control the breathability of high resiliency polyurethane foam, particularly foam containing a high content of graft copolymer. Moreover, voids in the foam are eliminated or greatly reduced when these copolymers are employed.

Surprisingly, this invention allows the independent control of stability as a function of terminal hydroxy group concentration and processing latitude (cell openness) as a function of primary to secondary or tertiary hydroxy ratio. This is particularly useful in allowing the preparation of polyoxyalkylene pendants having high ethylene oxide content, thus obtaining the advantageous hydrophilic properties associated with high ethylene oxide content, while maintaining secondary or tertiary terminal hydroxy groups to give foam stabilization and control the desired cell openness characteristics.

This invention further provides a synthesis of the copolymers, including the polyoxyalkylene pendants so that the desired stabilizing advantages are realized while at the same time obtaining a broad processing latitude and an open celled (highly breathable) polyurethane foam. Further, this invention illustrates the use of these polyoxyalkylene pendants in conjunction with conventionally capped pendants on the siloxane copolymer to more finely control stability and processing latitude.

DETAILED DESCRIPTION OF THE INVENTION

This invention is based on the discovery that polyoxyalkylene pendants bearing terminal secondary or higher order hydroxy groups can be attached to polydimethylsiloxanes to make copolymers that are useful in stabilizing high resiliency polyurethane foam containing high levels of reinforcing grafted copolymer, while at the same time maintaining control of the desired open celled characteristics of the foam. If is part of this invention that, to insure that the terminal group is a secondary or tertiary hydroxy group, the polyoxyalkylene pendant is prepared whereby propylene oxide or other appropriate epoxide is reacted in the final addition step after all other oxyalkylene units have been reacted This discovery allows for the production of high breathability, i.e., open-celled, molded, flexible, polyurethane foam having levels of reinforcing grafted copolymer from essentially none to concentrations well in excess of that now possible with conventional stabilizers. The high solids content can be increased by either increasing the concentration of conventional grafted copolymer polyols used in making the resulting urethane foam or by increasing the concentration of copolymer added to the polyol used to make the foam. Foams with higher reinforcing grafted copolymer levels are desirable because they can be used to make firmer foams with improved load bearing capability.

The polydialkylsiloxanepolyoxyalkylene is a block copolymer consisting of a polydimethylsiloxane backbone and polyoxyalkylene pendants. More particularly, the polyoxyalkylene pendants of the present invention are prepared in such a manner as to insure a secondary or tertiary terminal hydroxy group. This is achieved by initially preparing a desired allyl started polyoxyalkylene of the structure:

$$C_nH_{2n-1}\text{---}O\text{---}(C_2H_4O)_b\text{---}(C_3H_6O)_c\text{---}H$$

where n has a value of 2 to 4, preferably 3; b has a value of 0 to 10, preferably 2 to 5; c has a value of 0 to 10, preferably 0 to 4, and most preferably 0; and b+c equals one to ten, preferably 2 to 6.

Under the appropriate reaction conditions, the polyoxyalkylene is then extended through the addition of a propylene oxide or other suitable alkylene oxide, so as to provide a secondary or tertiary terminal hydroxy group. It should be understood that this product will contain not only the secondary or tertiary terminated groups but will also include varying amounts of primary hydroxy terminated groups.

The polyoxyalkylene having a secondary or tertiary hydroxy group so formed is then reacted, either alone or in conjunction with a second, conventionally capped polyoxyalkylene, with a polydialkylsiloxane to form a polydialkylsiloxanepolyoxyalkylene block copolymer wherein the polydialkylsiloxane contains from two to ten silicon atoms, preferably 3 to 6 silicon atoms. The final product is a mixture of substituted and unsubstituted polydialkylsiloxane having a mole average of at least 0.5 silicon atoms substituted with a polyoxyalkylene pendant of the general formula:

A. Hydroxy terminated pendants selected from the groups:

1. 50 to 100 percent, preferably 80 to 100, by weight of the hydroxy terminated pendants of

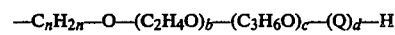

$$\text{---}C_nH_{2n}\text{---}O\text{---}(C_2H_4O)_b\text{---}(C_3H_6O)_c\text{---}(Q)_d\text{---}H$$

wherein n, b and c are as defined above; and Q is an oxyalkylene group having a secondary or tertiary carbon atom adjacent to the terminal oxygen atom. Preferably, Q is generated from propylene oxide, isobutylene oxide, 1,2-epoxybutane or 2,3-epoxybutane. The value of d is from 1 to 3, preferably 1; and 2. 0 to 50 percent preferably 0 to 20, by weight, of the hydroxy terminated pendants of

wherein n, b and c have values as defined above but can be different; and

B. Non-hydroxy terminated pendants of the formula:

wherein n, a, b, and c have values defined above but can be different; b plus c equals one to ten; and X is an alkoxy or acetoxy group containing one to four carbons.

The hydroxy terminated pendant designated A-1 above must be present in an amount equal to at least 5 percent of all the polyoxyalkylene pendants present (A-1, A-2 and B) and can be present in as much as 100 percent of such polyoxyalkylene pendants.

The polydialkylsiloxane-polyoxyalkylene copolymer is prepared by a platinum catalyzed hydrosilyation of a polyoxyalkylene with a polysiloxane have SiH units by conventional techniques. See for instance U.S. Pat. No. 4,031,044. The polysiloxane is prepared through an equilibration of trialkylsiloxanes (M units), dialkylsiloxanes (D units) and monoalkylhydridosiloxanes (D' units) as taught by U.S. Pat. No. 3,741,917. The polyoxyalkylene is prepared by reacting an alcohol starter with a strong base to make an alkoxide, which is subsequently reacted with alkylene oxide and ultimately capped as taught by U.S. Pat. Nos. 2,425,755; 2,448,664; and 3,507,923.

Selection of the particular ratio of alkyl or acyl capped to hydroxy terminated polyoxyalkylene in the stabilizer is dependent on the amount of grafted copolymer to be used. It has been discovered that the open-celled structure of the foam can be controlled by tipping the hydroxy terminated polyoxyalkylene pendant with a secondary or tertiary hydroxy group through some method such as chain extension with one of the higher alkylene oxides listed above. It is important that the tertiary hydroxy group is included as the terminal group rather than being incorporated into the polyalkylene oxide chain.

The amount of stability offered to the foaming solution is determined by the relative amount of hydroxy terminated polyoxyalkylene pendants to capped polyoxyalkylene pendants attached to the silicone backbone. Thus, as the desired amount of grafted copolymer increases a greater amount of hydroxy terminated polyoxyalkylene pendants is determined by the desired grafted copolymer loading, the open-celled structure of the foam is controlled by varying the amount of secondary or tertiary hydroxy group in the terminal position.

The relative amount of polydialkylsiloxanepolyoxyalkylene stabilizer used to make the polyurethane foam can vary over wide ranges but are generally employed in amounts ranging from about 0.02 to 5 parts by weight or greater per hundred parts of the grafted copolymer polyol, i.e., the combined added copolymer and polyol. Generally there is no commensurate advantage to using these stabilizers in excess of five parts by weight, while the use of amounts of below 0.02 parts by weight can result in foam instability. Preferably the polydialkylsiloxane-polyoxyalkylene stabilizers are employed in amounts ranging from 0.02 to 2.0 parts by weight per hundred parts by weight of the organic polyol.

High resiliency polyurethane foam is typically made by reacting grafted copolymer polyol, catalyst, surfactant and blowing agent, with an isocyanate to produce the foam.

The grafted copolymer polyols used in this invention are obtained by polymerizing ethylenically unsaturated monomers in a polyether polyol as described in British Pat. No. 1,063,222 and in U.S. Pat. No. 3,383,351. Suitable grafting monomers for producing such compositions include, for example, acrylonitrile, vinyl chloride, styrene, butadiene, paramethyl styrene, vinylidene chloride, and the like.

Suitable polyether polyols for producing such grafted copolymer polyols include, for example any polyether polyol containing at least 40 mole percent of primary hydroxyl groups and having a molecular weight from about 2,000 to about 8,000. Conversely said polyether triols can contain no more than 60 percent secondary hydroxyl groups. Preferably said polyether triols contain about 55 to 90 mole percent of primary hydroxyl groups and have a molecular weight from about 4,000 to 7,000. The preferred polyether polyols used in this invention are polyalkylene-ether polyols obtained by the chemical addition of alkylene oxides to trihydroxyl organic containing materials such as glycerol; 1,2,6-hexanetriol; 1,1,1-trimethylolpropane; and the like as well as mixtures thereof. The alkylene oxides employed in producing the preferred polyether polyols described above normally have from 2 to 4 carbon atoms, inclusive while propylene oxide and mixtures of propylene oxide and ethylene oxide are especially preferred.

The polyether polyol reactants used in this invention can be mixtures consisting essentially of said above defined polyether triols and other polyether polyols having an average of at least two hydroxyl groups, said above defined polyether triols amounting to at least 40, preferably 50, weight percent of the total polyether polyol content of the mixtures. Illustrative of such other polyether polyols are diols, tetrols, reinforcing graft copolymers polyols and the like, as well as mixtures thereof. Examples of such polyether polyols that can be mixed with the above defined polyether triols include those adducts of alkylene oxide to such polyols as diethylene glycol; dipropylene glycol; pentaerythritol; sorbitol; sucrose; lactose; alphamethylglucoside; alphahydroxyalkyglucoside; novolac resin; water; ethylene glucol; propylene glycol; trimethylene glycol; 1,2-butylene glycol; 1,3-butanediol; 1,4-butanediol; 1,5-pentanediol; 1,2-hexanediol; 1,2-hexane glycol; 1,10-decanediol; 1,2-cyclohexane- diol; 2-butene-1,4-diol; 3-cyclohexane-1,1-dimethanol; 4-methyl-3-cyclohexane-1,1-dimethanol; 3-methyl-1,5-pentanediol; 4-(2-hydroxyethoxy)-1-butanol; and the like as well as mixtures thereof.

These graft copolymer/polyether polyol compositions can contain from about 1 to 70 weight percent, preferably 5 to 50 weight percent, and most preferably 10 to 45 weight percent of the unsaturated monomer polymerized in the polyether polyol. Such compositions are conveniently prepared by polymerizing the monomer in the selected polyether polyol at a temperature of 40 to 150 degrees centigrade in the presence of a free radical polymerization catalyst, such as peroxides, persulfates, percarbonates, perborate and azo compounds as more fully described by the above patent references. This polymerization is preferably done in situ. Especially preferred are the graft polymer/polyether polyols obtained from mixtures of acrylonitrile and styrene and polyether triols.

Suitable graft copolymer polyols employed in this patent may also be obtained from reacting diisocyanates with polyamines or hydrazines in polyether polyol solutions as described in U.S. Pat. No. 4,042,537. Reactants for producing said grafted copolymer polyols include among others the polyisocyanates such as 2,4- and 2,6-toluene diisocyanates and mixtures of these isomers, polyphenyl-polymethylene polyisocyanates, and hexamethylene diisocyanate. The isocyanates are reacted with either polyamines or hydrazines to form the polymer dispersed within and grafted to the polyether polyol solvent for the reaction. Suitable polyamines include: divalent and higher polyvalent primary or secondary, aliphatic araliphatic cycloaliphatic or aromatic amines. Specific examples include amount others, ethylene diamine, hexamethylene diamine, 4-aminobenzylamines, 4,4'-diaminodicyclohexylmethane, phenylene diamines, toluene diamines, and the like. Suitable hydrazines include hydrazine, methyl hydrazine, hydrazine hydrate, phenyl hydrazine, benzyl hydrazine, and cyclohexyl hydrazine. The level of polyureas of polyhydrazodicarbonamides dispersed in the polyether polyol may vary within wide limits, although it is generally from 1 to 40 percent by weight based on 100 parts by weight of polyether polyol.

A variety of well-known organic isocyanates can be employed in the foam formulations of this invention for reaction with the polyether polyol starting materials above described to provide polyurethane foams.

Particularly useful isocyanate components are combinations of isomeric tolylene diisocyanates (TDI) and polymeric isocyanates having units of the formula:

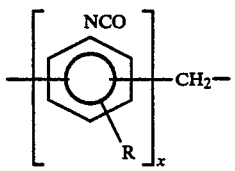

wherein R is hydrogen and/or lower alkyl and x has an average value of at least 2.1 (MDI). Preferably the lower alkyl radical is methyl and x has an average value of from 2.1 to about 3.0.

The amount of polyisocyanate employed will vary slightly depending on the nature of the polyurethane being prepared. In general the polyisocyanates are employed in the foam formulations of this invention in amounts that provide from 80 to 150 percent, preferably from 90 to 115 percent of the stoichiometric amount of the isocyanato groups required to react with all of the hydroxyl groups of the organic polyol starting materials and with any water present as a blowing agent. Most preferably, a slight amount of isocyanato groups in excess to the stoichiometric amount is employed.

The blowing agents which can be employed in the process of this invention include water, liquified gases which have boiling points below 80° F. and above −60° F., or other inert gases such as nitrogen, carbon dioxide, helium and argon. Suitable liquified gases include saturated aliphatic fluorohydrocarbons which vaporize at or below the temperature of the foaming mass. Such gases are at least partially fluoronated and can also be otherwise halogenated. Fluorocarbon blowing agents suitable for use in foaming the formulations of this invention include trichlorofluoromethane, dichlorodifluoromethane, dichlorofluoromethane, 1,1-chloro-1-fluoroethane, 1,1-difluoro-1,2,2-trichloroethane, and 1,1,1,2,3,3,4,4,4-nonafluoro-2-chlorobutane. The preferred blowing agent for the process of this invention is trichlorofluoromethane. The amount of blowing agent used will vary the density in the foamed product. Usually from 2 to 20 parts by weight of the blowing agent per 100 parts by weight of the organic polyol starting materials are preferred.

The catalysts employed in this invention to produce polyurethanes include any of the amines or metal catalysts used in producing molded, flexible polyurethane foam. Illustrative of such conventional amine catalysts are N-methyl morpholine, N-ethyl morpholine, hexadecyl dimethylamine, triethylamine, N,N,N',N'-tetramethyl-1,3-butanediamine, N,N-dimethylethanolamine, diethanolamine, 3-dimethylamino-N,N-dimethylpropionamide, bis(2-dimethylaminoethyl)ether, N,N,N',N'-tetramethyl ethylenediamine, 4,4'-methylene bis(2-chloroaniline), dimethyl benzylamine, N-coco morpholine, triethylene diamine, the formate salts of triethylene diamine, other salts of triethylene triamine and oxyalkylene adducts of primary and secondary amino groups and the like. Illustrative of conventional metal catalysts are the tin salts of various carboxylic acids and nickel acetylacetonates. The preferred metal catalyst for the process of this invention is dibutyltindilaurate. Such amine and metal catalysts are preferably employed in the mixtures in an amount from 0.1 to 2 weight percent based on the total weight of the organic polyol starting material.

Other additional ingredients can be employed in varying amounts in producing the high resiliency polyurethane foams in accordance with the process of this invention, if desired, for specific purposes. Thus flame retardants, e.g., trichloroethylphosphine can be used to reduce any tendency of the polyurethane foam to flammability. Of course, any suitable organic solvent for the catalysts can be used which does not substantially adversely affect the operation of the process or reactants. Examples of such solvents for the catalysts include polyols, e.g., 2-methyl-2,4-pentanediol, dipropylene glycol and the like.

In accordance with this invention, the molded, flexible polyurethane foams can be produced by any suitable technique. The preferred process is a one-step or one shot technique wherein all of the reactants are reacted simultaneously with the foaming operation. A second general process is called the prepolymer process whereby a prepolymer is formed by reacting the polyether polyol with a small excess of the isocyanate and later foaming the prepolymer by the reaction with water or an inert blowing agent. Another method which can be used is the quasi-prepolymer technique which involves reacting a large excess of the isocyanate with the polyether polyol with additional polyether polyol in the presence of a blowing agent. Because of the high exothermic nature of the reaction, high resiliency polyurethane foams are rapidly produced without the need of any external heat by mixing the reactants at ambient temperature and pouring the foaming reaction into a suitable mold and allowing the foam to cure itself. Of course, it desired, the overall reaction can be further accelerated by preheating the mold and/or employing conventional high temperature post cure procedures. Of course, it is to be understood that the cold cure polyurethane foams of this invention can also be prepared in slabstock form if desired.

EXAMPLES

The following examples and procedures are presented to illustrate the invention, but are not to be construed as limiting thereon. Those examples considered to be examples of the invention are numbered and comparative examples are lettered.

Definitions

| " | inch |
|---|---|
| pphp | parts per hundred parts of polyol used |
| Polyol A | A polymer/polyol consisting of 21% by weight acrylonitrile/styrene polymer in a polyol based on ethylene and propylene oxides which polyol has a hydroxyl number of 28. |
| Polyol B | A polyether polyol based ethylene and propylene oxides which polyol has a hydroxyl number of 35. |
| Amine catalyst A | An amine catalyst made from bis(2-dimethylaminoethyl)ether and dipropylene glycol in a ratio of 30 to 70. |
| Amine catalyst B | An amine catalyst made from triethylenediamine and dipropylene glycol in a ratio of 33 to 67. |
| TDI | Tolylene diisocyanate. |
| AMTG | Allylmethoxytriglycol |
| APEG-200 | Allyl started polyethylene glycol with a 200 molecular wt |

EXAMPLES

Dialkylsiloxanepolyoxyalkylene Copolymer Preparation

Example 1

Example 1 illustrates the preparation (see U.S. Pat. Nos. 2,425,755, 2,448,664, 3,507,923 and 4,478,957) of allyl started polyoxyalkylene pendants that are currently used as pendants for preparing silicone surfactants for high resiliency polyurethane foam.

Allylpolyoxyalkylene A was prepared by the reaction of 1.57 kg of allyl alcohol containing potassium allylate catalyst (0.9%K), with 4.15 kg of a mixture of 57% ethylene oxide and 43% propylene oxide fed continuously over 4.7 hours at 95° C. This was cooled, 123 gms of magnesium silicate was added and then heated for six hours at 95° C. The result is an allyl started polyoxyalkylene of 213 MW containing 1.15 equivalents of propylene oxide and 2.03 equivalents of ethylene oxide per allyl.

Similarly, Allylpolyalkyleneoxide B was prepared by reacting only ethylene oxide to potassium allylate in allyl alcohol to form an allylpolyalkyleneoxide of 206 MW.

Example 2

Example 2 illustrates the preparation of allyl started polyoxyalkylene pendants containing secondary or tertiary terminal hydroxy groups that are the object of this invention.

Allylpolyalkyleneoxide C was prepared by first reacting 1.57 kg of allyl alcohol containing potassium allylate (0.9% K), with 2.36 kg of ethylene oxide fed continuously over 2.1 hours at 95° C. The solution was then heated at 95 degrees for 1.5 hours to consume al the ethylene oxide. 1.78 kg of propylene oxide was then fed to the mixture over 7.0 hours and allowed to react, thus tipping the allylpolyethyleneoxide with a secondary hydroxy terminal group. The solution was cooled and treated with 122 gms of magnesium silicate at 95° C. for six hours. The result is an allyl started polyoxyalkylene of 213 molecular weight containing a 2.03 equivalents of oxyethylene tipped with 1.15 equivalents of oxypropylene.

Similarly, Allylpolyalkyleneoxides D and E were prepared by reacting 1.5 and 2.0 equivalents of propylene oxide with the allylpolyethyleneoxide started used for allylpolyoxyalkylene C.

Example 3

1458 gms of hexamethyldisiloxane (($Me_3Si$)$_2O$), 1232 gms of dimethylsiloxane cyclics (($Me_2SiO$)$_n$), and 648 gms of a low molecular weight methylhydridosiloxane fluid ($Me_3SiO(MeHSiO)_nSiMe_3$) were mixed in a five liter flask. 65 gms of sulfuric acid catalyst was added and the mixture was stirred for 2.5 hours. The undissolved acid was removed by pipette and an additional 65 gms of sulfuric acid added. The reaction was then stirred for 16 hours. The undissolved acid was removed and the solution neutralized with $NaHCO_3$. The mixture was filtered to give an equilibrated product of nominal structure $Me_3SiO(Me_2SiO)_{1.85}(MeHSiO)_{1.2}SiMe_3$ (Siloxane I).

Similarly, a second precursor was made with the nominal structure $Me_3SiO(Me_2SiO)_{2.5}(MeHSiO)_{2.5}SiMe_3$ (Siloxane II) by equilibrating 1140.8 gms of hexamethyldisiloxane, 1302.4 gms of dimethylsiloxane cyclics and 1056 gms of a low molecular weight methylhydrosilixane fluid.

Example 4

150 grams of $Me_3SiO(Me_2SiO)_{1.85}(MeHSiO)_{1.2}SiMe_3$ and 13.4 gms of the Allylpolyoxyalkylene C were mixed and in a 500 ml flask. The mixture was heated to 65° C. and 1.5 ml of a platinum solution (90 ppm Pt) added. When the temperature reached 90° C. an additional 120.7 gms of Allylpolyoxyalkylene C was added slowly. When no residual SiH was detected, the flask was cooled to room temperature and the solution was neutralized with $NaHCO_3$. The solution was filtered to give the copolymer.

The remainder of the copolymers listed in Table 2 was prepared in the same manner. Where two polyoxyalkylene pendants are attached to a single siloxane, it should be noted that they were mixed together before being used in the hydrosilylation reaction.

TABLE 1

| Allylpolyoxyalkylene Pendants | | | | |
|---|---|---|---|---|
| Pendant | MW | Equivalents EO | Equivalents PO Tip | Equivalents PO Cofed |
| A | 213 | 2.03 | 0.00 | 1.15 |
| B | 206 | 3.39 | 0.00 | 0.00 |
| C | 213 | 2.03 | 1.15 | 0.00 |
| D | 233 | 2.03 | 1.50 | 0.00 |
| E | 262 | 2.03 | 2.00 | 0.00 |

TABLE 2

| Dimethylsiloxanepolyoxyalkylene Copolymers | | | | |
|---|---|---|---|---|
| Copolymer | Siloxane Structure | OH Terminated Pendant | Mole % OH Pendant | Mole % AMTG Pendant |
| 1 | Siloxane II |   | 0.0 | 100 |
| 2 | Siloxane II | B | 100 | 0.0 |
| 3 | Siloxane II | B | 50 | 50 |

TABLE 2-continued

Dimethylsiloxanepolyoxyalkylene Copolymers

| Copolymer | Siloxane Structure | OH Terminated Pendant | Mole % OH Pendant | Mole % AMTG Pendant |
|---|---|---|---|---|
| 4 | Siloxane II | B | 15 | 85 |
| 5 | Siloxane II | D | 100 | 0.0 |
| 6 | Siloxane II | D | 50 | 50 |
| 7 | Siloxane II | D | 15 | 85 |
| 8 | Siloxane II | C | 100 | 0.0 |
| 9 | Siloxane II | C | 50 | 50 |
| 10 | Siloxane II | C | 15 | 85 |
| 11 | Siloxane II | A | 100 | 0.0 |
| 12 | Siloxane II | A | 50 | 50 |
| 13 | Siloxane II | A | 15 | 85 |
| 14 | Siloxane I |  | 0.0 | 100 |
| 15 | Siloxane I | B | 100 | 0.0 |
| 16 | Siloxane I | B | 50 | 50 |
| 17 | Siloxane I | B | 15 | 85 |
| 18 | Siloxane I | E | 100 | 0.0 |
| 19 | Siloxane I | E | 50 | 50 |
| 20 | Siloxane I | E | 15 | 85 |
| 21 | Siloxane I | D | 100 | 0.0 |
| 22 | Siloxane I | D | 50 | 50 |
| 23 | Siloxane I | D | 15 | 85 |
| 24 | Siloxane I | C | 100 | 0.0 |
| 25 | Siloxane I | C | 50 | 50 |
| 26 | Siloxane I | C | 15 | 85 |
| 27 | Siloxane I | A | 100 | 0.0 |
| 28 | Siloxane I | A | 50 | 50 |
| 29 | Siloxane I | A | 15 | 85 |

Foaming Experiments

A general foaming procedure was adopted for all of the foaming tests presented in this patent. For ease of handling, the silicone surfactants of the present invention employed in the foaming experiments were first diluted in Polyol B to a 20% surfactant solution. With the exception of the isocyanate, all of the ingredients listed in the formulation were initially weighed into a cup. This solution was then stirred for 75 seconds. The solution was allowed to degas fro 15 seconds. The isocyanate was then added to the cup and the solution stirred for another 5 seconds. Finally, the mixture was poured into the appropriate, preheated mold which was then sealed during the foaming reaction. After a five minute cure, the mold was opened and the foam evaluated.

All foams were made using the formulation listed below:

Formulation 1

| Component | Concentration |
|---|---|
| Polyol A | 100 pphp |
| Amine Catalyst A | 0.1 |
| Amine Catalyst B | 0.5 |
| Diethanolamine | 0.9 |
| Water | 3.0 |
| TDI (103 index) | 36.8 |
| Surfactant Solution | Varied |

Concentration is expressed in parts per hundred parts of polyol.

Block Mold Test and Evaluation for Stability

The ability of a surfactant to stabilize foam against shear collapse in a mold was evaluated in a block mold test. A 15"×15"×4" aluminum mold was fitted with an 11.5"×6"×3" aluminum block. The block was situated on the bottom of the mold with each short side of the block 1.75" from side of the mold, and one long side of the block 1.0" from the side of the mold. The foaming solution was poured into the open portion of the mold. After sealing the mold, the foam was allowed to flow around and over the block to fill the entire mold. After curing, the foam was removed and the top 0.5" cut off. This allowed internal evaluation of shear collapse over the block and under the vents in the lower portion of the foam. The foam was evaluated from one to ten based on the amount of observed collapse, with one representing total collapse and ten representing little or no collapse. Thus the higher the rating the more effective the surfactant was in stabilizing the foam.

Foam Breathability Test

Foam breathability was measured using Formulation 1 to make foams in a 15"×15"×4" box mold. The foaming solution, including a selected concentration of surfactant, was prepared as described above and poured into the mold which was sealed while the foam cured. Upon removal, the foam was allowed to stand for 15 minutes. At this time the foam was observed for shrinkage. If no shrinkage had occurred, then a second foam was prepared using a higher concentration of surfactant. This process is repeated until a break point is determined such that the onset of shrinkage conincides with the increased surfactant concentration. Since shrinkage is related to the number of open cells in the foam, the breathability imparted to the foam by the surfactant can be determined by the amount of surfactant required to cause foam shrinkage. Thus, the higher the required surfactant concentration for shrinkage, the more breathable and better the surfactant. The concentration of the surfactant required shrinkage is referred to as the top end, a higher top end being better.

TABLE 3

High Resiliency Foam Breathability and Stability Test Measurements

| Copolymer | Breathability[1] | Stability |
|---|---|---|
| 1 | na | 4.0 |
| 2 | 0.175 | 9.5 |
| 3 | 1.250 | 8.5 |
| 4 | 4.750 | 8.0 |
| 5 | 1.250 | 9.0 |
| 6 | 3.750 | 8.5 |
| 7 | 8.000 | 8.5 |
| 8 | 0.750 | 9.5 |
| 9 | 3.500 | 8.5 |
| 10 | 7.750 | 8.5 |
| 11 | 0.500 | 9.0 |
| 12 | 2.750 | 8.5 |
| 13 | 6.250 | 8.0 |
| 14 | na | 4.0 |
| 15 | 0.238 | 9.5 |
| 16 | 0.500 | 9.5 |
| 17 | 4.380 | 8.5 |
| 18 | 4.000 | 8.0 |
| 19 | 6.000 | 8.0 |
| 20 | 9.000 | 9.0 |
| 21 | 3.250 | 9.5 |
| 22 | 5.250 | 8.0 |
| 23 | 9.000 | 8.0 |
| 24 | 2.750 | 9.0 |
| 25 | 5.000 | 8.0 |
| 26 | 6.500 | 8.0 |
| 27 | 1.750 | 8.5 |
| 28 | 3.500 | 8.5 |
| 29 | 4.750 | 9.0 |

[1]reported in pphp surfactant solution

Example 5

Table 3 lists the results for foam breathability and foam stability tests performed using the surfactants prepared in Example 4. The results demonstrate the advantage of tipping the polyoxyalkylene pendant with a secondary or tertiary hydroxy group to obtain improved breathability while maintaining stability during the foaming reaction.

Copolymers 1 and 14 show that the hydroxy group is necessary to obtain good foam stability. In these experiments, the methoxy capped pendant (AMTG) is not capable of stabilizing higher levels of grafted copolymer (stability rating of 4.0). In contrast, the remainder of the experiments demonstrate that copolymers containing as little as fifteen percent hydroxy terminated polyoxyalkylene pendants significantly improve the stability rating of the foam. Stability ratings of 7.0 or better are projected to be sufficient to stabilize foam in commercial molds with the grafted copolymer levels used in this test. The copolymers in these experiments are consistently 8.0 or higher, thus indicating their ability to stabilize high resiliency molded urethane foams.

It is important to note that in the experiments just described, the surfactants containing propylene oxide tipped pendants (thus those containing secondary hydroxy terminated pendants) are able to stabilize foam as well as the APEG-200 pendant (primary hydroxy terminated pendants) and the ethylene oxide/propylene oxide cofed pendants (kinetically determined primary and secondary hydroxy terminated pendants). Thus the change from an alkyl cap to a hydroxy terminated pendant is significant in obtaining stability. The nature of the hydroxy group, primary versus secondary or tertiary, is not critical for stability but is critical for breathability.

Copolymers 2 to 4 and 15 to 17 demonstrate that copolymers containing primary hydroxy groups produce extremely tight foams that would have difficulty in commercial foaming operations. Even when incorporated into the copolymer in conjunction with a methoxy capped pendant as in experiments 3, 4, 16 and 17, the tightening effect of the primary hydroxy group produces too tight a foam.

Copolymers 11 to 13 and 27 to 29 demonstrate the effect of cofeeding ethylene oxide and propylene oxide in the manner currently practiced in the industry as a means of preparing the poloxyalkylene pendant. The result is primary and secondary hydroxy terminated pendants on a single surfactant that gives some improvement over the all primary hydroxy terminated pendant, but only to a limited degree. Increasing the presence of the secondary hydroxy terminated pendant can be obtained when an extremely high ratio of propylene oxide to ethylene oxide feed is used. However, this would significantly alter the hydrophyolic/hydrophobic balance of the pendant and thus alter the surfactant performance in a negative manner.

Copolymers 8 to 10 and 24 to 26 are direct comparisons to copolymers 11 to 13 and 27 to 29. The pendants prepared for these copolymers have the same molecular weight and ethylene oxide/propylene oxide ratio. The difference is that the pendants for copolymers 8 to 10 and 24 to 26 were prepared by adding propylene oxide to the allyl started polyoxyethylene. Thus the primary hydroxy groups of the starter are converted by propylene oxide to give secondary hydroxy terminated pendants. The result is a significant increase in the foam breathability. This demonstrates the need to have the secondary or tertiary hydroxy groups added at the terminal position rather than incorporated internally in the pendant. Further, this demonstrates a method of preparing pendants that have a high ethylene oxide content, desirable for instance in formulations having higher water content, and a secondary or tertiary terminal hydroxy group to control foam breathability.

Copolymers 5 to 7, 21 to 23 and 18 to 20 demonstrate that increasing the amount of propylene oxide from 1.15 to 1.5 to 2.0 equivalents continues to increase the breathability by covering a higher percentage of primary groups until a maximum is reached.

Example 6

500 gms of APEG 200 was weighed into a 500 ml flask. 1.95 gms of potassium was added and the temperature slowly brought up to 105° C. 45 gms of isobutylene oxide was slowly added to the reaction flask from a dropping funnel while holding the temperature at 105° C. The reaction ran for two hours and was cooled. The mixture was neutralized with an aqueous HCl solution followed by sodium bicarbonate. The solution was dried with magnesium sulfate. The product was analyzed by gas chromatography as a 100% isobutoxy terminated APEG 200 containing <2% propenyl.

Example 7

55.8 grams of $Me_3SiO(Me_2SiO)_{1.7}(MeHSiO)_{1.0}$-$_5SiMe_3$ and 5 grams of isobutyloxy terminated APEG 200 prepared in Example 6 was placed in a 250 ml flask. 1.0 ml of a chloroplatinic acid solution (90 ppm platinum) was added. The temperature was raised to 90° C. 51.6 grams of isobutoxy terminated APEG 200 was added dropwise while maintaining the temperature for 15 minutes after the completion of the addition. When no residual SIH was detected, the solution was cooled to 35° C. 1 gram of sodium bicarbonate was added and the reaction stirred overnight. The reaction was then filtered to give the product.

The above copolymer was then dissolved in polyol B to make a 27% solution and tested in the foam breathability test using formulation 1. For the siloxane made with 100 percent isobutoxy terminated APEG 200, the top end was 7.5 pphp.

What is claimed is:

1. A method of improving the breathability of a polyurethane foam which comprises forming a reaction mixture of a polyol, catalyst, isocyanate, blowing agent and surfactant and thereafter reacting said reaction mixture to form a polyurethane foam characterized by employing as the surfactant a mixture of substituted and unsubstituted polydialkylsiloxane copolymers containing from two to ten silicon atoms and having a mole average of at least 0.5 silicon bonded polyoxyalkylene groups per copolymer molecule, said groups consisting of:
  A. hydroxy terminated polyoxyalkylene groups wherein:
    1. 50 to 100 percent by weight of the hydroxy terminated polyoxyalkylene groups are of the formula:

$$-C_nH_{2n}-O-(C_2H_4O)_b-(C_3H_6O)_c-(Q)_d-H$$

wherein n has a value of 2 to 4; b has a value of 0 to 10; c has a value of 0 to 10; b+c has a value of 1 to 10; d has a value of 1 to 3; and Q is an oxyalkylene group having a secondary or tertiary carbon atom adjacent to the terminal oxygen atom, and wherein 2. 0 to 50 percent by weight of the hydroxy terminated polyoxyalkylene groups are of the formula:

$$-C_nH_{2n}-O-(C_2H_4O)_b-(C_3H_6O)_c-H$$

wherein n, b and c have values as defined above but can be different; and

B. non-hydroxy terminated polyoxyalkylene groups of the formula:

$$-C_nH_{2n}-O-(C_2H_4O)_b-(C_3H_6O)_c-X$$

wherein n, a, b, and c have values defined above but can be different; and X is an alkyl or acyl group containing one to four carbons;

wherein the hydroxy terminated polyoxyalkylene group having the secondary or tertiary carbon atom must be present in an amount equal to at least 5 to 100 percent by weight of all the polyoxyalkylene groups present.

2. The surfactant of claim 1 wherein the hydroxy terminated polyoxyalkylene group having the secondary or tertiary carbon atom constitutes 80 to 100 percent by weight of the hydroxy terminated polyoxyalkylene groups.

3. The surfactant of claim 2 wherein n equal 3; b equals 2 to 5; c equals 0 to 4; and b+c equals 2 to 6.

4. The surfactant of claim 2 wherein c equals 0.

5. The surfactant of claim 1 wherein the substituted polydialkylsiloxanepolyoxyalkylene copolymer is of the general formula $$P_mR_{3-m}SiO(R_2SiO)_y(RPSiO)_zSi\ R_{3-m}P$$

wherein
P is the polyoxyalkylene group as defined in claim 1,
R is an alkyl a group containing from 1 to 6 carbon atoms,
m is 0 or 1,
y is 0 to 8
z is 0 to 8
m+z is at least one, and
y+z is 0 to 8.

6. The surfactant of claim 5 wherein R is methyl.

7. The surfactant of claim 5 wherein y+z is 1 to 4.

8. The surfactant of claim 5 wherein m is 0 and z is 1 to 8.

9. The surfactant of claim 5 wherein m is 1 and z is 0.

* * * * *